Dec. 31, 1968 P. ELVIS ETAL 3,419,679
START-STOP SYNCHRONIZATION CHECKING CIRCUIT FOR LONG TRAINS, SHORT TRAINS AND SINGLE START-STOP CHARACTERS
Filed June 9, 1966
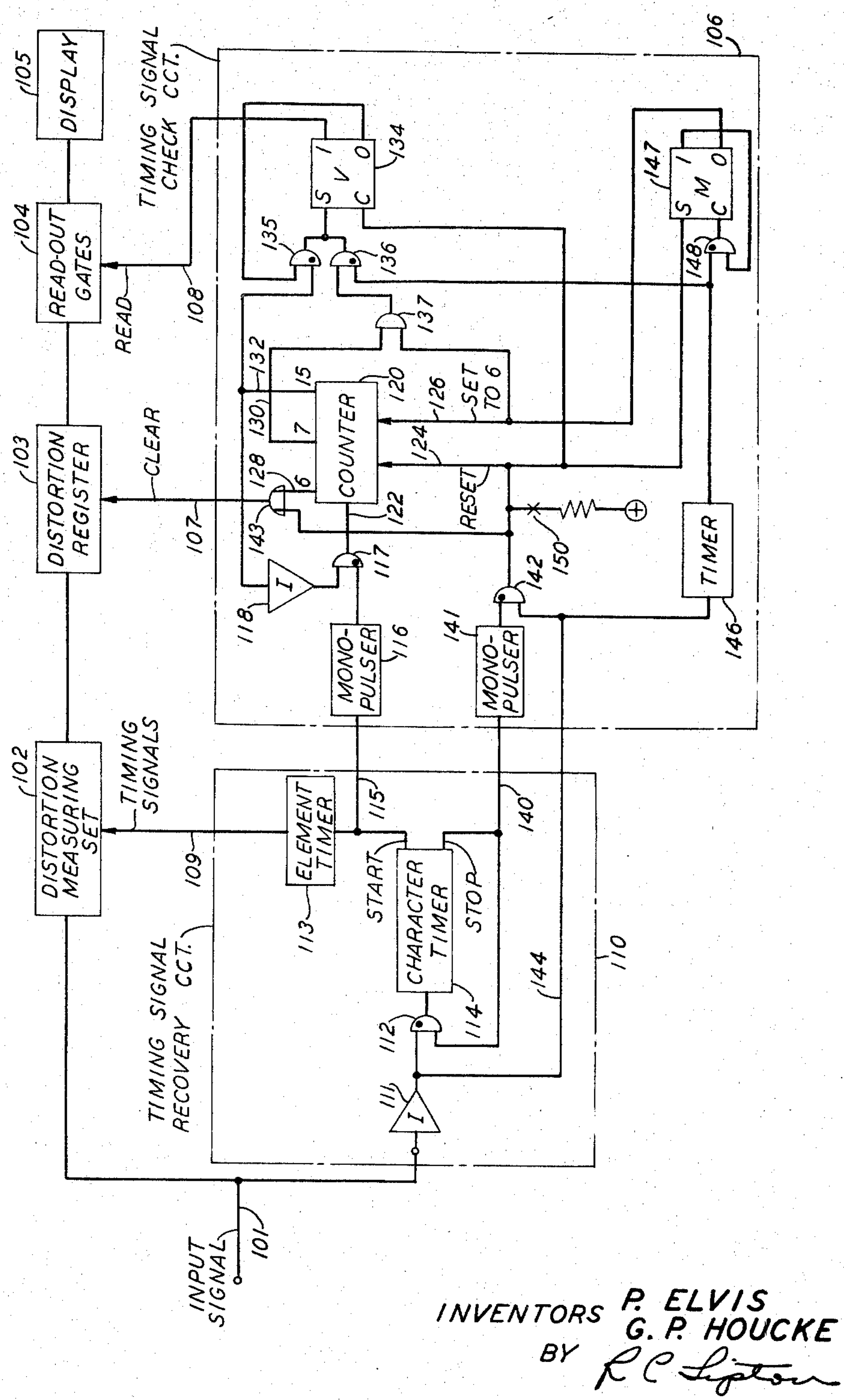
INVENTORS P. ELVIS
G. P. HOUCKE
BY R C Lipton
ATTORNEY United States Patent Office 3,419,679
Patented Dec. 31, 1968

3,419,679

START-STOP SYNCHRONIZATION CHECKING CIRCUIT FOR LONG TRAINS, SHORT TRAINS AND SINGLE START-STOP CHARACTERS

Peter Elvis, South Ozone Park, N.Y., and George P. Houcke, Tenafly, N.J., assignors to Bell Telephone Laboratories, Incorporated, Murray Hill, Berkeley Heights, N.J., a corporation of New York Filed June 9, 1966, Ser. No. 556,472
6 Claims. (Cl. 178—53.1)

ABSTRACT OF THE DISCLOSURE

Receiver synchronization is checked by counting a predetermined number of received start-stop characters. Each start element initiates the timing of a data character and advances a counter one count. When the counter has been advanced to a predetermined count read-out gates are enabled, thus indicating that the timing signals are synchronized with the incoming signals. Loss of synchronism is indicated by the generation of a stop pulse by the timing circuit concurrently with the input of a spacing condition, which resets the counter. If a predetermined number of synchronized data characters is applied following a prolonged idle condition, the read-out gates are enabled by the counter that has advanced to its predetermined count. Loss of synchronism resets the counter. Likewise, if a prolonged idle condition is followed by a single data character followed by another prolonged idle condition, the read-out gates are enabled.

This invention relates to a circuit for checking the synchronization of a data receiver with incoming data signals and, more particularly, to a check circuit which uses alternative criteria for determining whether the receiver is synchronized.

It is a broad object of this invention to check whether a data receiver is synchronized with incoming data signals.

In data receivers, the prime functions is the scanning or reading of incoming data signals. The scanned data may then be stored, processed, displayed or measured for distortion, for example. With respect to data elements received serially in time, the receiver scans each incoming data element at a precise instant which may occur at the theoretical midpoint of the data element or at the transition between the elements. This instant must be precise to insure that every data element is examined once.

Data signals, whether synchronous or asynchronous, include synchronizing or framing information which indicates the relative phase positions of the accompanying data elements. At the receiver this synchronizing information is recovered in the form of timing signals which are then utilized to determine the instants to scan the data element midpoints or transitions.

In binary element data signals the signal conditions of the synchronizing elements and the information elements are identical. For example, the start element of start-stop data characters is always in the "spacing" condition and the stop element is always in the "marking" condition, which conditions are identical to information spacing and marking elements, respectively. The recovery circuit may thus identify an information element as synchronizing information resulting in out-of-phase timing signals and consequent improper scanning.

Synchronizing elements such as start and stop bits are unique, however, insofar as they are repetitive, invariably occurring in accordance with some fixed pattern. Considering start-stop code elements, the start bit occurs at the beginning of each code character and the stop bit occurs at the termination of the character. If the character has, for example, eight information elements, then the midpoint of the stop bit invariably follows the midpoint of the start bit after an interval equal to the duration of nine code elements. Although a marking element, not a stop bit, may occur nine element intervals after a spacing element, this occurrence is not invariably repetitive. Accordingly, the synchronizing information can be identified at the receiver by a check circuit which confirms that the locally generated timing signals are maintained in phase with a plurality of the repetitive incoming synchronizing bits over a prolonged period of time involving the duration of a plurality of data characters.

Providing precise scanning instants are particularly necessary where the distortion of the data signal output of the receiver is to be measured since the measurement of the distortion is the relation of the phases of the timing signals and the data transitions. It is important, therefore, that the receiver synchronization be checked before the distortion readings are displayed. The incoming signals, however, may not necessarily comprise long messages or pulse trains. In some instances the signals to be measured are small groups of characters and, in one instance, a single isolated character.

Accordingly, it is an object of this invention to reduce the prolonged period required to check receiver synchronization in certain selected situations. This object is attained, in accordance with the invention, by using alternative criteria to satisfy the check requirements.

In accordance with an illustrative embodiment of the invention, the measuring set distortion readings are displayed after the check circuit is satisfied that the timing signals are synchronized with incoming start-stop code character signals, which signals may comprise long messages, character groups with intervening idle time, or single characters interrupting prolonged idle time periods. The alternative criteria satisfying the check circuit comprises confirmation that the timing signals are maintained in phase with a plurality of data characters, that synchronism is maintained with a smaller number of characters which follow an idle or no signal period, or that a single character is received following and preceding prolonged idle time intervals. The check circuit is thus satisfied for long trains, short trains, and single characters. Although the criteria for short trains and single characters appear to be less exacting, it is noted that these signals must follow idle time periods wherein the first spacing signal interrupting the period is likely to be the start bit of the character.

The foregoing and other objects and features of this invention will be fully understood from the following description of an illustrative embodiment thereof taken in conjunction with the accompanying drawing showing, in schematic form, a system for measuring incoming signal distortion and a synchronization check circuit therefore which utilizes alternative criteria.

Referring now to the drawing, the incoming signals to be measured are obtained from input lead 101 and applied in parallel to a timing signal recovery circuit generally indicated by block 110 and to the input of a distortion measuring set generally indicated by block 102. These signals may comprise start-stop data character elements. As is well known in the art, a distortion measuring set examines the transitions of data character elements and compares the phase thereof with locally generated timing signals to provide indications at the output thereof of any distortion of the individual data elements. The timing signals are locally generated by timing signal recovery circuit 110 and applied to measuring set 102 via lead 109. The output of distortion measuring set 102 is then connected to a distortion register generally indicated by block 103. Distortion register 103 may comprise a plurality of binary devices. These devices are controlled by the output of distortion measuring set 102 to register the extent of the distortion of the incoming data character signals. The registration of the distortion in distortion register 103 may be cleared by a signal applied to distortion register 103 by way of clear input lead 107. This clearing may function, for example, by resetting all the binary devices in distortion register 103 to their initial state.

The output of distortion register 103 extends to the read-out gates generally indicated by block 104. Read-out gates 104 may comprise a series of gate devices which upon the application of a read signal by way of lead 108 pass the distortion reading in register 103 to display 105. Display 105 may comprise a series of lamps, for example, which lamps when energized would thereby indicate the distortion reading registered in distortion register 103.

In accordance with this invention, the readout of the distortion register 103 by read-out gates 104 to display 105 is provided only when the locally generated timing signals are synchronized with the incoming data signals. This determination is made by a timing signal check circuit generally indicated by block 106. As described hereinafter check circuit 106 provides the clear pulse to distortion register 103 by way of input lead 107 when there is a loss of synchronism between the locally generated timing signals and the incoming data signals. Alternately, check circuit 106 provides the read pulse to read-out gates 104 by way of lead 108 in the event that the incoming signals are synchronized with the timing signals.

As described in detail hereinafter, check circuit 106 provides three alternative criteria for determining whether the incoming signal and the timing signals are synchronized. These three criteria are that the timing signals are synchronized with fifteen consecutive data characters; that following a prolonged idle condition the timing signals are synchronized with nine consecutive data characters; and that after a prolonged idle condition the timing signals are synchronized with one data character which is followed by another prolonged idle condition.

In general, timing signal recovery circuit 110, in addition to providing timing signals to measuring set 102, generates a start pulse and a stop pulse which occur during the start element and stop element of the incoming data character when the operation of recovery circuit 110 is in synchronism with the incoming data signals. Check circuit 106, in addition to providing the clear pulse to register 103 and the read pulse to gates 104, determines whether the operation of recovery circuit 110 is synchronized with the incoming data signals, maintains a count of the number of consecutive synchronized data characters, and times the duration of incoming idle conditions. Recovery circuit 110 passes the generated start pulse and stop pulse and the incoming signals to check circuit 106 by way of leads 115, 140 and 144, respectively. Check circuit 106 checks the generated stop pulse and the incoming stop element to determine whether recovery circuit 110 is operating in synchronism with the incoming data character. The generated start pulse is utilized by check circuit 106 to provide the character count.

Considering now the details of timing signal recovery circuit 110, the input signals on lead 101 applied to recovery circuit 110 are extended to the input of inverter 111. Inverter 111 inverts the incoming signals and the inverted signals at the output thereof are passed to check circuit 106 by way of lead 144 and to one input of pulsing gate 112.

Pulsing gate 112 has two input leads: one of the leads comprising the previously described connections for the output of inverter 111. This connection as can be seen in the drawing is immediately adjacent to a dot within pulsing gate 112 and is hereinafter referred to with respect to gate 112 and to corresponding pulsing gates as the input pulsing lead. The other input lead hereinafter referred to as the enabling lead functions to enable the pulsing gate when in the high voltage condition and conversely to disable the pulsing gate when in the low voltage condition. If the enabling lead of pulsing gate 112 is in the high voltage condition, the gate is therefore enabled to pass positive transitions applied to the input pulsing lead to the output lead. Thus, assuming the enabling lead of pulsing lead 112 is in the high voltage condition, a positive transition at the output of inverter 111 is passed by pulsing gate 112 to the input of character timer 114. An input mark-to-space transition on input lead 101 provides a positive-to-negative transition to inverter 111. Inverter 111 thus applies in response to the mark-to-space transition a positive going pulse to gate 112. Accordingly, when gate 112 is enabled, inverter 111 applies a positive transition to character timer 114 in response to a mark-to-space transition of the input signal.

Character timer 114 is provided with two output leads: a start output lead which extends to the input of element timer 113 and to check circuit 106 by way of lead 115, and a stop output lead which is connected to the enabling lead of pulser gate 112 and to check circuit 106 by way of lead 140. In the initial or idle condition, the start output lead of character timer 114 is in the low voltage condition and the stop output lead is in the high voltage condition, thereby enabling pulser gate 112. Assuming that a mark-to-space input signal is received while character timer 114 is in the idle condition, this is recognized as the initiation of a start element by character timer 114 since gate 112 is enabled to pass the resultant positive transition to the input of character timer 114. Character timer 114, accordingly, initiates the operation of timing the character and during the timing interval drives the start output lead to the high voltage condition and the stop output lead to the low voltage condition, thereby disabling gate 112 and precluding the application of subsequent mark-to-space transitions to the input of character timer 114. Character timer 114 is maintained in this condition until the theoretical midpoint of the stop element of the incoming data character, whereupon the start lead is restored to the low condition and the stop lead is restored to the high condition. Accordingly, assuming that character timer 114 is in synchronism with the incoming signals, it restores during the reception of the stop element and consequently while the input signal on lead 101 is in the marking or high condition.

As previously described, if character timer 114 is in synchronism with the incoming data signal, the start lead goes to the high voltage condition upon the reception of the start element of the data character and restores to the low voltage condition during the reception of the stop element of the data character. Accordingly, upon the reception of the start element of the data character, the start lead goes to the high voltage condition providing a positive condition to lead 115 which, as previously described, extends to check circuit 106. In addition, the start lead applies a positive condition to the input of element timer 113.

Element timer 113 is a clock or pulse generating circuit which provides timing signals to distortion measuring set 102 by way of lead 109. When enabled by the application of a positive condition to the input thereof, element timer 113 proceeds to generate timing signals which may be utilized by measuring set 102 to check the distortion of the incoming data signals. The initiation of the operation of element timer 113, however, must be fixed in time with respect to the reception of the start element of the incoming data characters. In accordance therewith, character timer 114 removes the negative condition applied to the input of element timer 113 upon the reception of the start element and substitutes a high condition therefor to initiate the generation of the timing signals. It is apparent that character timer 114 must be in synchronism with the incoming data characters, initiating each timing operation upon the reception of the start element, to enable measuring set 102 to make proper distortion measurements.

As previously described during the reception of the stop element, character timer 114 times out, re-establishing the low condition on the output start lead. This removes the high condition applied to the input of element timer 113 and terminates the generation of the timing signals. Concurrent therewith, character timer 114 re-establishes the high condition on the output stop lead. This enables pulsing gate 112 and prepares the gate to pass the pulse from inverter 111 to character timer 114 upon the reception of the next mark-to-space transition. Assuming character timer 114 is synchronized with the incoming data, this next mark-to-space transition will comprise the initiation of the new start element. It is noted that the positive transition on the output stop lead of character timer 114 is also applied to lead 140 which extends to check circuit 106. Thus, a positive transition is applied to lead 140 at the theoretical midpoint of the stop element. The function of this pulse will be described hereinafter.

The first criteria for determining synchronization involves counting fifteen consecutive data characters. As previously described, timing signal recovery circuit 110 when in synchronism with the incoming data characters applies a positive pulse to lead 115 upon the initiation of the start element of the data character and applies a positive pulse to lead 140 at the midpoint of the stop element. Considering in detail timing signal check circuit 106, it is seen that lead 115 extends therein to monopulser 116. The output of monopulser 116 is connected in turn to the input pulsing lead of pulsing gate 117, whose enabling lead is normally in the high condition as described hereinafter. Accordingly, monopulser 116 responds to the positive transition applied to the input thereof by providing a pulse to normally enabled pulser gate 117. The output of pulser gate 117 is in turn connected to counter 120 by way of input lead 122. Thus upon the initiation of each timing operation by character timer 114 in response to the reception of each start element, pulser gate 117 applies a pulse to counter 120 by way of lead 122.

Counter 120 may comprise a binary counter having a plurality of bistable stages providing a count of sixteen. Counter 120 is advanced in response to pulses applied to input lead 122, reset to the initial count in response to a pulse applied to reset lead 124, and set to a count of six in response to an input pulse applied to lead 126. Counter 120 also has three output leads which comprise lead 128 which goes to the high condition when the counter advances to the count of six, lead 130 which goes to the high condition when counter 120 advances to the count of seven, and lead 132 which goes to the high condition when counter 120 advances to the count of fifteen.

In the initial condition of counter 120, lead 132 is in the low condition since counter 120 is not advanced to the count of fifteen. This low condition is passed to the input of inverter 118 whereby a high condition is applied to the enabling lead of pulser gate 117. Accordingly, pulser gate 117 is enabled to pass the pulses provided by monopulser 116 whereby counter 120 is advanced upon each reception of a start element.

Assuming that six data characters are received with proper synchronization, counter 120 is advanced to the count of six without being reset in a manner described hereinafter. In this event, output lead 128 goes positive providing a positive transition to the input of OR gate 143. Accordingly, OR gate 143 provides a positive transition at the output thereof which positive transition is passed to lead 107. This comprises the clear pulse which, as previously described, clears any registration out of distortion register 103.

Assuming now that character timer 114 is in synchronism with nine additional data characters, monopulser 116 will continue to provide advance pulses to counter 120 by way of gate 117 and lead 122, thus advancing the count to fifteen. When counter 120 advances to the count of fifteen, lead 132 goes to the high condition whereby inverter 118 applies a low condition to pulser gate 117 thereof, disabling the gate. Further advances of counter 120 are thus precluded. The low-to-high condition transition on lead 132 is also applied to the input pulsing lead of gate 135. Assuming that V flip-flop 134 is normally in the cleared condition and the "0" output thereof is thus in the high condition, this high condition is applied to the enabling lead of pulser gate 135, thus enabling the gate. Accordingly, the positive going transition on lead 132 is passed by gate 135 to the input set lead of V flip-flop 134, thereby setting the flip-flop. The setting of V flip-flop 134 provides a positive transition at its "1" output terminal. Since the "1" output terminal is connected to lead 108, a positive transition read pulse is applied thereto and thence to read-out gates 104. Thus, with the advance of counter 120 to the count of fifteen, V flip-flop 134 is set, a read-out pulse is applied to read-out gates 104, and as previously described the distortion reading in register 103 is passed to display 105. Since register 103 was cleared after the reception of the sixth character, this reading involves the distortion, if any, of the seventh through the fifteenth characters.

As described above, when the operation of timing signal signal for fifteen characters, counter 120 is advanced to recovery circuit 110 in synchronism with the incoming the count of fifteen, setting V flip-flop 134 to provide the read pulse to read-out gates 104. Thus, one criteria for determining whether the incoming signal and the timing signals are synchronized is satisfied. In the event, however, that a loss of synchronization occurs, counter 120 will be reset as described hereinafter thereby requiring the reinitiation of the character count. To determine whether the incoming signal is synchronized with the operation of recovery circuit 110, a check is made if the marking stop condition of the incoming signal is present when recovery circuit 110 generates the stop pulse.

As previously described, character timer 114 provides a pulse at the stop output at the theoretical midpoint of the stop element. This pulse is passed by way of lead 140 to timing signal check circuit 106. Lead 140 extends to the input of monopulser 141. Accordingly, monopulser 141 provides a pulse at the output thereof, which output extends to the input pulsing lead of pulsing gate 142.

Considering now the enabling lead of pulsing gate 142, this lead extends to lead 144, which in turn is connected to the output of inverter 111 in recovery circuit 110. As previously disclosed, the output of inverter 111 is low when the input signal is marking and the output is high when the input signal is spacing. Accordingly, assuming the input signal comprises a marking stop element, the output of inverter 111 is in the low voltage condition, which condition is applied by way of lead 144 to the enabling lead of pulsing gate 142. Accordingly, gate 142 is disabled during the reception of the stop element, precluding the passage therethrough of the stop pulse.

Assuming now that a spacing condition is on input signal lead 101 concurrently with the generation of the stop pulse, it is apparent that the operation of character timer 114 is out of synchronism with the input signal. In this event, with the input signal in the spacing condition, inverter 111 provides a high condition at the output thereof, thereby enabling pulsing gate 142. With the gate enabled, the generated stop pulse and the consequent pulse generated by monopulser 141 is passed through gate 142 and thence to reset lead 124, whereby counter 120 is reset to the initial count. Thus, in each instance when the stop pulse is generated concurrently with the application of an input spacing condition, loss of synchronism is indicated and counter 120 is reset to its initial count.

The output of gate 142 is also connected to an input of OR gate 143. When a loss of synchronism occurs, the output pulse thereby produced by gate 142 is also passed through gate 143 to distortion register 103 by way of lead 107, thereby clearing register 103. It is thus seen that upon loss of synchronism the reading, if any, of distortion register 103 is cleared.

The output of gate 142 also extends to the clear input of V flip-flop 134 and the set input of M flip-flop 147. Thus, when gate 142 provides a pulse at the output thereof, due to a loss of synchronism, V flip-flop 134 is set to the clear condition and M flip-flop 147 is set to the set condition. As previously described, V flip-flip 134, when placed in the set condition, provides the read pulse. A loss of synchronism thus restores V flip-flop 134 to the initial clear condition preparing V flip-flop 134 to generate a read pulse upon the satisfaction of a criteria which determines that the incoming signals and the timing signals are synchronized. The functions of M flip-flop 147 will be described hereinafter. It is noted at this time, however, that M flip-flop 147 is placed in a set condition by gate 142 when there is a loss of synchronism.

Another criteria for determining whether the incoming signals and the timing signals are synchronized involves a prolonged idle condition followed by nine consecutive synchronized data characters. This prolonged idle condition is determined by timer 146.

The input to timer 146 extends to lead 144 and then to the output of inverter 111 in recovering circuit 110. Timer 146 has a time-out period which may comprise, for example, 500 milliseconds which is comparable in duration to five data characters. The timer is enabled when a low voltage condition is applied to the input thereof and reset whenever a high voltage condition is applied to the input thereof. In the event that a prolonged low voltage input condition is applied to the input of timer 146 for an interval exceeding 500 milliseconds, the normally low voltage condition at the output thereof momentarily goes to the high condition.

As previously described, the output of inverter 111 goes to the high condition in response to an input signal spacing condition and goes to the low voltage condition in response to an input signal marking condition. Since the output of inverter 111 is connected to the input of timer 146 by way of lead 144, whenever the input signal goes spacing the consequent high voltage condition at the output of inverter 111 resets timer 146. Accordingly, any incoming spacing condition resets timer 146 and timer 146 must re-initiate a new timing period. When the incoming signal is marking, inverter 111 applies a low condition to timer 146. Assuming that an incoming idle condition is being received, timer 146 is permitted to operate through its timing interval. If this idle condition prevails for over 500 milliseconds, timer 146 times out and applies a positive pulse to the input pulsing leads of pulsing gates 136 and 148.

Considering now pulsing gate 148, the enabling lead thereof extends to the "1" output terminal of M flip-flop 147. M flip-flop 147 is normally in the set condition, being previously set, for example, by any loss in synchronization as previously described. Accordingly, the "1" output terminal of M flip-flop 147 provides a high condition to pulsing gate 148 and the gate is thereby enabled to pass the pulse generated by timer 146 to the clear input of M flip-flop 147. Accordingly, after a prolonged idle condition, timer 146 places M flip-flop in the clear condition.

With M flip-flop in the clear condition, the output voltage of the "1" output terminal goes low, disabling pulsing gate 148. The "0" output terminal of M flip-flop 147 terminal goes high, however, and this positive transition is passed to lead 126 whereby, as previously described, counter 120 is set to a condition wherein a count of six is registered therein. Accordingly, with a count of six registered in counter 120, a positive pulse is provided at lead 128 and passed by way of OR gate 143 to clear register 103.

With counter 120 now advanced to the count of six, subsequent start pulses from character timer 114 advance the count from this initial count of six. Assuming now that after the prolonged idle condition, nine successive characters are received and timing signal recovery circuit 110 operates in synchronism with these characters, each received character will result in an advance pulse to counter 120, as previously described. Since it is assumed that a loss of synchronism does not occur, pulsing gate 142 does not provide a reset pulse and counter 120 advances to the count of fifteen in response to nine characters. With counter 120 at the count of fifteen, V flip-flop 134 is set as previously described, and a read pulse is applied to read-out gates 104. Accordingly, when the criteria of a prolonged idle condition followed by nine successive data characters is satisfied, the reading in distortion register 103 is read out to display 105.

In the event that any of the nine characters followed by the prolonged idle condition is not in synchronism with recovery circuit 110, pulser gate 142 passes a pulse to the set input of M flip-flop 147, as previously described. M flip-flop is thus placed in the set condition and counter 120 is restored to the initial count. Accordingly, check circuit 106 is restored to the initial condition and the cycle repeated to satisfy the criteria and thus provide the read pulse.

The third criteria which may be satisfied comprises a prolonged idle condition followed by a single data character and another prolonged idle condition. As previously described, upon the reception of the prolonged idle condition, timer 146 clears M flip-flop 147. Counter 120 is therefore advanced to the count of six and distortion register 103 is cleared, as previously described. In addition the high condition at the "0" output terminal of M flip-flop 147 is passed to one input of AND gate 137. The other input to AND gate 137 extends to lead 130 which goes to the high voltage condition when counter 120 advances to the count of seven.

Assuming now that a data character is received on input line 101, the operation of character timer 114 is initiated providing a pulse toe lead 115 whereby monopulser 116 advances counter 120 to the count of seven. A positive condition is thus provied to lead 130 whereby both of the input leads to AND gate 137 are in the high condition. AND gate 137 in turn, therefore, provides a high condition at the output thereof, which high condition is passed to the enabling lead of pulsing gate 136.

Assuming now that no further characters are received, the subsequent idle condition on input line 101 enables timer 146 which again times out. The consequent output pulse is now passed to the input pulsing lead of pulsing gate 136. Since pulsing gate 136 is enabled by AND gate 137, pulsing gate 136 passes the pulse generated at the output of timer 146 to the set input of V flip-flop 134. The setting of V flip-flop 134 thereby provides the read pulse as previously described. It is therefore seen that upon the satisfaction of the criteria of the reception of a prolonged idle condition followed by one data character and another prolonged idle condition, V flip flop 134 is set to provide a read pulse to read out the registration in distortion register 103 to display 105.

Timing signal check circuit 106 can be restored to the initial condition at any time by the operation of key 150. This operation passes a positive pulse through key 150, which pulse is applied concurrently to one input of OR gate 143, reset lead 124 of counter 120, the clear input of V flip-flop 134, and the set input of M flip-flop 147. Accordingly, when key 150 is operated the registration in distortion register 103 is cleared, counter 120 is reset to its initial count, V flip-flop 134 is cleared and M flip-flop 147 is set. Timing signal check circuit 106 is thereby restored to its initial idle condition.

Although a specific embodiment of this invention has been shown and described, it will be understood that various modifications may be made without departing from the spirit of this invention and within the scope of the appended claims.

What is claimed is:

1. In a receiver for data signals interspersed with synchronizing signals including means responsive to said received synchronizing signals for generating timing signals, means jointly controlled by said timing signals and by said received data signals, and a check circuit for enabling said controlled means when said receiver is synchronized with said received signals in accordance with alternative criteria, said check circuit comprising, means for comparing the phase of said timing signals and said received synchronizing signals, counter means responsive to said comparing means and advanced with the reception of each of said data signals from an initial count to a final count while said received synchronizing signals are in phase with said timing signals, means responsive to said advance of said counter to said final count for enabling said controlled means, and means operated in the absence of the reception of data signals for a predetermined interval of time for advancing said counter.

2. In a receiver for data signals in accordance with claim 1 wherein said operated means advances said counter from said initial count to a count intermediate said initial count and said final count.

3. In a receiver for data signals in accordance with claim 2 including further means jointly responsive to said advance of said counter to a selected count subsequent to said intermediate count and to said operated means at the conclusion of said predetermined interval of time for enabling said controlled means.

4. In a receiver for data signals in accordance with claim 3 wherein said further means is prepared by a prior operation of said operated means which advanced said counter to said intermediate count.

5. In a receiver for start-stop character element code signals, a character timer responsive to the reception of each of said start elements for generating local start and stop pulses, an element timer responsive to said character timer for generating timing signals, means responsive to said timing signals for reading said received character element signals, a counter advanced step by step in response to each generated start pulse from an initial count to a final count, means responsive to said stop pulse for resetting said counter to said initial count upon a failure of said incoming signal having a stop element condition concurrently with the generation of said stop pulse, means responsive to said advance of said counter to said final count for enabling said reading means, and means for advancing said counter a plurality of steps after an idle period, said means operated in the absence of the reception of said start-stop character element signals for a predetermined interval of time.

6. In a receiver for start-stop character element code signals in accordance with claim 5 including other means conditioned by said operated means after said idle period for enabling said reading means, said other means being jointly enabled by the advance of said counter to a predetermined count in response to the reception of code signals after said idle period and by said operated means after a subsequent idle period.

References Cited

UNITED STATES PATENTS 2,822,422 2/1958 Terry et al. -------- 178—53.1 X

ROBERT L. GRIFFIN, *Primary Examiner.*

WILLIAM S. FROMMER, *Assistant Examiner.*

U.S. Cl. X.R.

178—69.5; 328—72; 340—147, 168